United States Patent
Gupta

(10) Patent No.: US 10,860,339 B2
(45) Date of Patent: Dec. 8, 2020

(54) AUTONOMOUS CREATION OF NEW MICROSERVICES AND MODIFICATION OF EXISTING MICROSERVICES

(71) Applicant: Dell Products L.P., Round Rock, TX (US)

(72) Inventor: Shubham Gupta, Jaipur (IN)

(73) Assignee: Dell Products L.P., Round Rock, TX (US)

( * ) Notice: Subject to any disclaimer, the term of this patent is extended or adjusted under 35 U.S.C. 154(b) by 89 days.

(21) Appl. No.: 16/054,003

(22) Filed: Aug. 3, 2018

(65) Prior Publication Data

US 2020/0042328 A1 Feb. 6, 2020

(51) Int. Cl.
  *G06F 9/44* (2018.01)
  *G06F 9/448* (2018.01)
  *G06F 9/22* (2006.01)
  *H04L 29/08* (2006.01)

(52) U.S. Cl.
  CPC ............... *G06F 9/448* (2018.02); *G06F 9/22* (2013.01); *H04L 67/327* (2013.01); *H04L 67/34* (2013.01)

(58) Field of Classification Search
  CPC ... G06F 8/36; G06F 9/22; G06F 9/448; G06F 9/5072; H04L 67/34; H04L 67/327
  See application file for complete search history.

(56) References Cited

U.S. PATENT DOCUMENTS

| | | | | |
|---|---|---|---|---|
| 6,536,037 B1* | 3/2003 | Guheen | ........................ | G06F 8/71 703/2 |
| 7,424,717 B2* | 9/2008 | Blevins | .................. | G06Q 10/06 719/318 |
| 8,261,295 B1* | 9/2012 | Risbood | .............. | H04L 41/5012 719/328 |
| 9,373,121 B1* | 6/2016 | Salge | ...................... | G06Q 30/02 |
| 9,716,617 B1 | 7/2017 | Ahuja et al. | | |
| 10,318,285 B1* | 6/2019 | Jodoin | ........................ | G06F 8/60 |
| 2004/0233236 A1* | 11/2004 | Yang | ........................ | G06F 9/451 715/763 |
| 2008/0127063 A1* | 5/2008 | Silva | ........................ | H04L 41/22 717/107 |
| 2009/0323555 A1* | 12/2009 | Lancaster | ........... | H04L 41/0253 370/254 |
| 2012/0047130 A1* | 2/2012 | Perez | ...................... | G06Q 10/00 707/723 |

(Continued)

*Primary Examiner* — Lewis A Bullock, Jr.
*Assistant Examiner* — Tina Huynh
(74) *Attorney, Agent, or Firm* — Ryan, Mason & Lewis, LLP

(57) ABSTRACT

Methods, apparatus, and processor-readable storage media for autonomous creation of new microservices and modification of existing microservices are provided herein. An example computer-implemented method includes generating and outputting, to a user via at least one graphical user interface, one or more prompts for user input pertaining to a target microservice; automatically configuring, for the target microservice, one or more microservice components based at least in part on the user input received in response to the one or more prompts; building the target microservice based at least in part on the one or more automatically configured microservice components; and outputting the built target microservice to at least one of a user and one or more cloud platforms.

20 Claims, 14 Drawing Sheets

(56) References Cited

U.S. PATENT DOCUMENTS

| | | | |
|---|---|---|---|
| 2012/0047483 A1* | 2/2012 | Amit | G06F 16/95 717/104 |
| 2015/0154012 A1* | 6/2015 | Wolfram | G06F 8/60 717/176 |
| 2015/0212812 A1* | 7/2015 | Tripathi | G06F 9/44505 717/120 |
| 2016/0124742 A1* | 5/2016 | Rangasamy | H04L 47/70 717/103 |
| 2016/0154645 A1* | 6/2016 | Chou | G06F 9/44505 717/121 |
| 2017/0220542 A1* | 8/2017 | Wolfram | G06F 8/38 |
| 2017/0242667 A1* | 8/2017 | Kotman | G16B 50/00 |
| 2018/0159747 A1 | 6/2018 | Chang et al. | |
| 2018/0210929 A1* | 7/2018 | Mukherjee | G06F 16/26 |

\* cited by examiner

AUTONOMOUS CREATION OF NEW MICROSERVICES AND MODIFICATION OF EXISTING MICROSERVICES

FIELD

The field relates generally to information processing systems, and more particularly to techniques for managing microservices using such systems.

BACKGROUND

With the increase in cloud technologies, an increased number of software applications are being moved to the cloud. Typically, to achieve such application movement, conventional application management techniques involve individuals decoupling monolithic architecture-based applications to microservices-based architecture. However, such conventional techniques are complex, and require significant amounts of time and effort. For example, the developers carrying out such conventional techniques need to be skilled in new technologies in order to build microservices, and generating a production-ready microservice can be a cyclical process requiring manual action and/or input from multiple individuals across various groups within a business or other enterprise.

SUMMARY

Illustrative embodiments of the invention provide techniques for autonomous creation of new microservices and modification of existing microservices. An exemplary computer-implemented method can include generating and outputting, to a user via at least one graphical user interface, one or more prompts for user input pertaining to a target microservice, and automatically configuring, for the target microservice, one or more microservice components based at least in part on the user input received in response to the one or more prompts. Such a method can also include building the target microservice based at least in part on the one or more automatically configured microservice components, and outputting the built target microservice to a user and/or deploying the built target microservice to one or more cloud platforms autonomously.

Illustrative embodiments can provide significant advantages relative to conventional application management techniques. For example, challenges associated with the significant time and effort required to build a production-ready microservice are overcome through the use of a semi-automated microservice development system requiring only limited and targeted user input. Such a semi-automated microservice development system facilitates increased developer efficiency, limiting developer input to implementation of business logic for the particular microservice in question. Additionally, such a semi-automated microservice development system facilitates uniformity across an architecture and consistent sufficiency throughout microservices therein.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
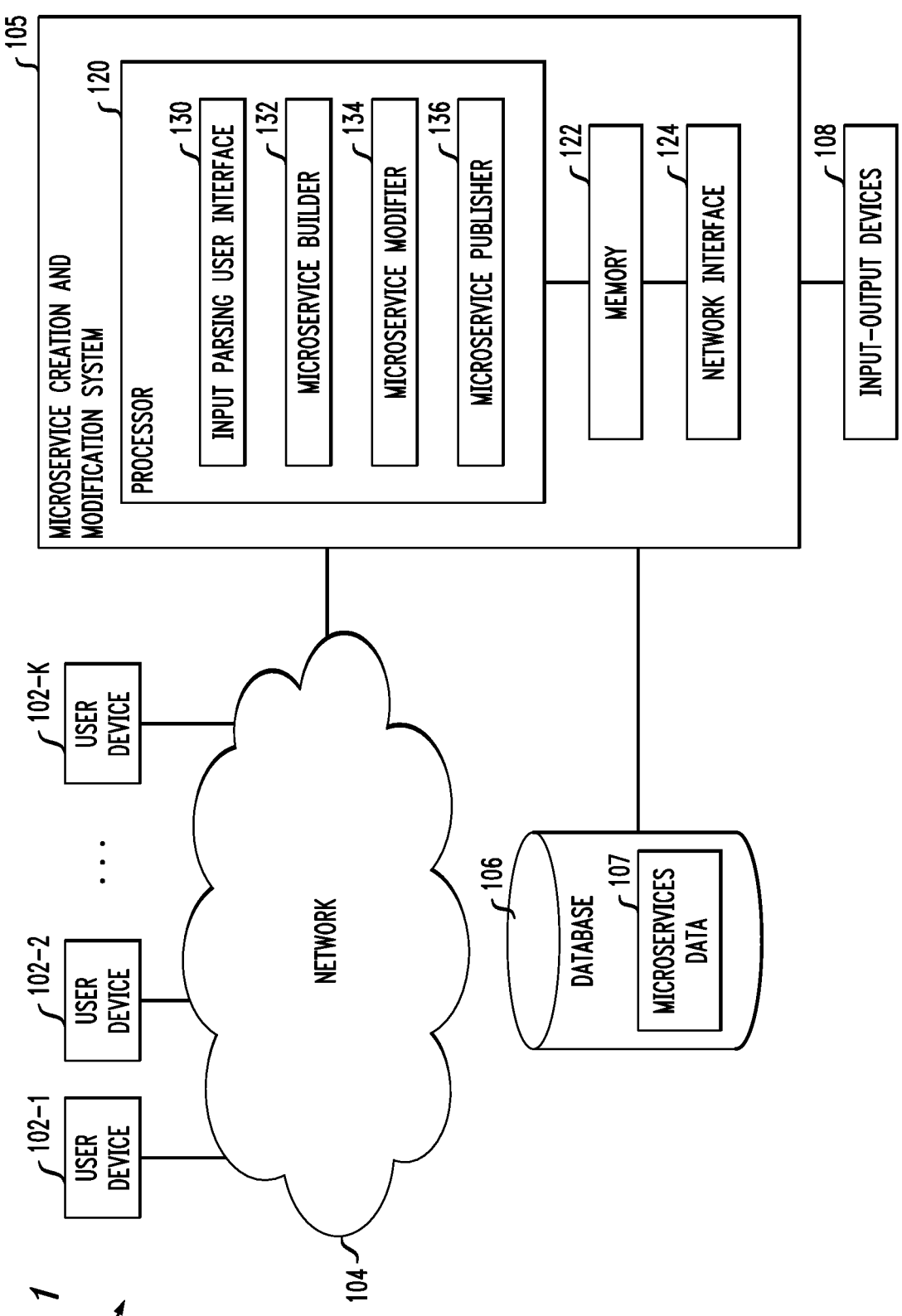
FIG. 1 shows an information processing system configured for microservice creation and modification in an illustrative embodiment of the invention.

FIG. 1 shows a computer network (also referred to herein as an information processing system) 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a microservice creation and modification system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The microservice creation and modification system 105 has an associated database 106 configured to store microservices data 107 illustratively comprising microservice catalogues, and microservice information such as name information, formatting information, data model information, controller information, etc.

The database 106 in the present embodiment is implemented using one or more storage systems associated with the microservice creation and modification system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the microservice creation and modification system 105 are input-output devices 108, which illustratively comprise keyboards, displays or other types of input-output devices in any combination. Such input-output devices are used to support one or more user interfaces to the microservice creation and modification system 105, as well as to support communication between the microservice creation and modification system 105 and other related systems and devices not explicitly shown.

The microservice creation and modification system 105 in the FIG. 1 embodiment is assumed to be implemented using at least one processing device. Each such processing device generally comprises at least one processor and an associated memory, and implements one or more functional modules for controlling certain features of the microservice creation and modification system 105.

More particularly, the microservice creation and modification system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the microservice creation and modification system 105 to communicate over the network 104 with the user devices 102, and illustratively comprises one or more conventional transceivers.

The processor 120 further comprises an input parsing user interface 130, a microservice builder 132, a microservice modifier 134 and a microservice publisher 136.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the input parsing user interface 130, microservice builder 132, microservice modifier 134 and microservice publisher 136 may be implemented at least in part in the form of software that is stored in memory 122 and executed by processor 120.

It is to be understood that the particular set of elements shown in FIG. 1 for creating new microservices and modifying existing microservices involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the microservice creation and modification system 105 can be eliminated and associated elements such as input parsing user interface 130, microservice builder 132, microservice modifier 134 and microservice publisher 136 can be implemented elsewhere in the computer network 100.

An exemplary process utilizing input parsing user interface 130, microservice builder 132, microservice modifier 134 and microservice publisher 136 of the microservice creation and modification system 105 in computer network 100 will be described in more detail with reference to the flow diagrams of FIG. 7 and FIG. 8.

At least one embodiment of the invention includes developing and/or implementing a tool which can build a new microservice for a user, as well as repair and/or modify an existing microservice for a user, using an interactive graphical user interface (GUI). As used herein, a microservice is a software development architecture that structures a software application as a set of coupled services, wherein each service runs a distinct process.

By way of illustration, when a user or team wants to build a microservice, the user or team can open the tool, configure one or more fields according to relevant requirements by providing inputs such as, for example, identification of a service end-point from which the microservice will obtain data, one or more required arguments, one or more expected returns, etc. Such configurations can also include microservice features such as logging, exception handling, service health check, swagger, etc., as well as specified business logic to be incorporated into one or more controllers. Additionally, in one or more embodiments of the invention, such configurations can be carried out directly from the tool GUI.

After configuring the microservice, the user or team can receive the microservice, with all of the configured features, with an option, for example, to directly build and deploy the microservice to a cloud platform for testing. Also, such a configuration tool can be language- and platform-agnostic.

Accordingly, one or more embodiments of the invention include automating microservice management processes by developing new microservices and/or repairing existing microservices based upon user inputs. Such an embodiment can be language- and platform-agnostic, and facilitates an ability to push new technologies and standards across microservices by repairing and/or modifying microservices with the automated techniques and systems detailed herein.

Figure 2:
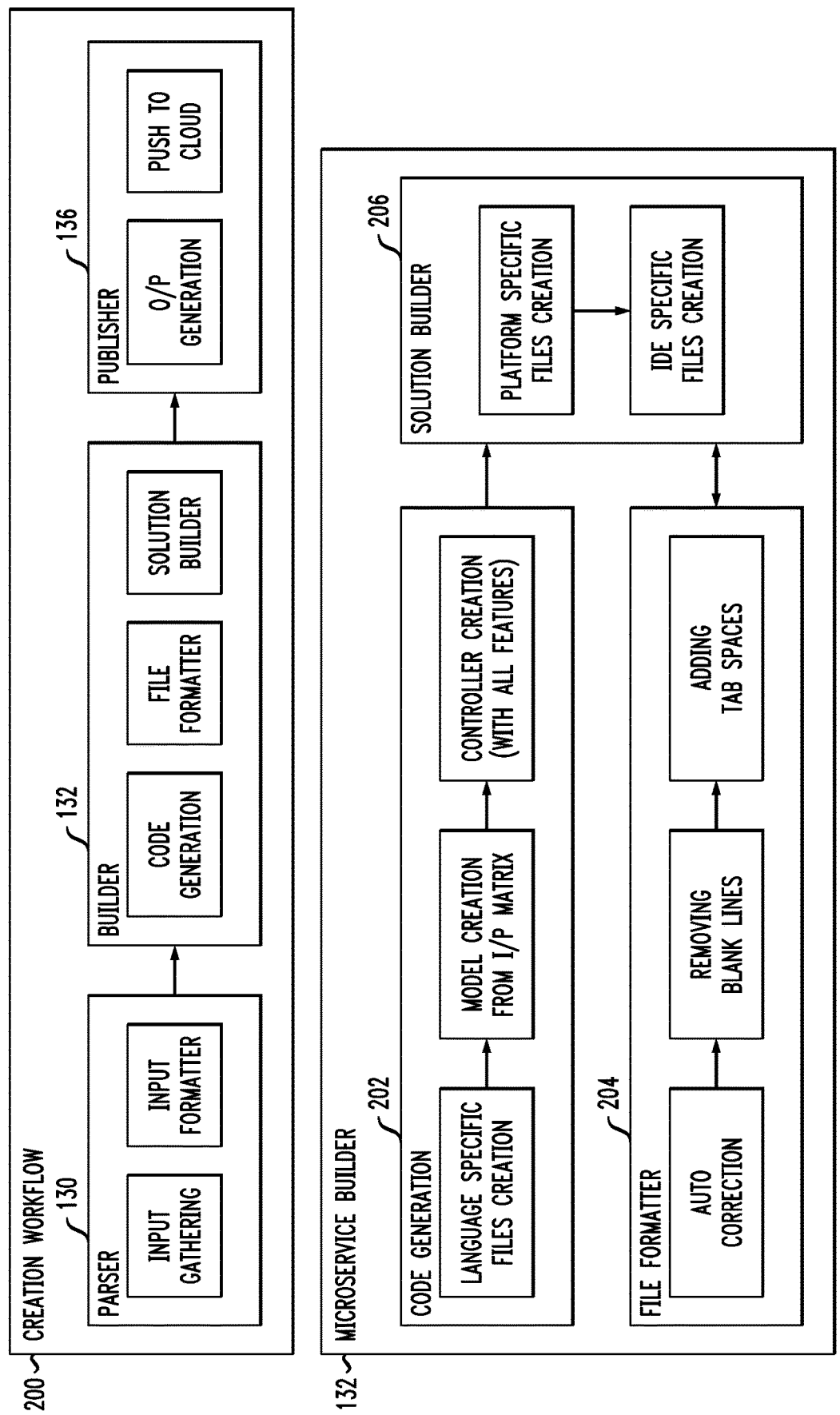
FIG. 2 is a system architecture diagram for a microservice creation workflow in an illustrative embodiment.

FIG. 2 is a system architecture diagram for a microservice creation workflow in an illustrative embodiment. By way of illustration, FIG. 2 depicts a creation workflow 200, which includes actions carried out by the input parsing user interface 130, the microservice builder 132, and the microservice publisher 136. As depicted in FIG. 2, the input parsing user interface 130 gathers input and formats the gathered input. The formatted input is then provided to the microservice builder 132, which generates code (as further described below in connection with component 202), formats one or more files (as further described below in connection with component 204), and builds a solution (as further described below in connection with component 206). The output of the microservice builder 132 is provided to the microservice publisher 136, which generates the microservice output and pushes the microservice to at least one cloud platform.

As noted above, the microservice builder 132 can include a code generation component 202, a file formatter 204, and a solution builder 206. The code generation component 202 creates language-specific files, creates one or more data models based on a user-provided input matrix, and creates one or more controllers (that encompass each of one or more microservice features selected by the user). These generated outputs are provided to the solution builder 206, along with outputs from the file formatter 204, which performs an auto-correction task on the code generated by component 202, removes one or more blank lines from the generated code, and adds one or more tab spaces (as relevant) to the generated code. Accordingly, the solution builder 206, based on the above-noted inputs, creates one or more platform-specific files and creates one or more integrated development environment- (IDE-) and framework-specific files.

Additionally, in at least one embodiment of the invention, such as the example embodiment depicted in FIG. 1, multi-threading can be utilized in code generation process.

Figure 3:
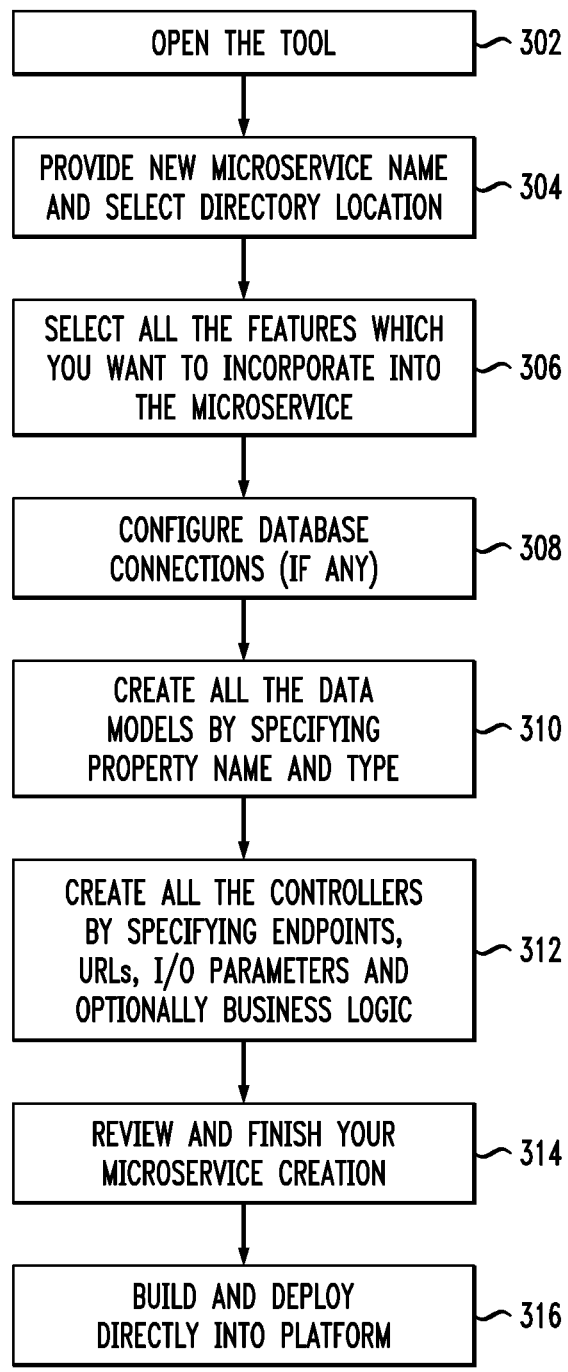
FIG. 3 is a flow diagram of a process for microservice creation in an illustrative embodiment.

FIG. 3 is a flow diagram of a process for microservice creation in an illustrative embodiment. Step 302 includes opening the tool (encompassing an example embodiment of the invention), and step 304 includes providing information such as microservice name, directory location, etc. Step 306 includes selecting the service features desired for the microservice (such as, for example, error handling, providing resiliency by implementing circuit breaker patterns, logging frameworks, integrating tools such as Swagger; incorporating service health checks, providing security with access token-based approach, etc.). Step 308 includes configuring one or more database connections (if any), and step 310 includes creating one or more data models for the microservice by specifying data model name and data model type. Additionally, step 312 includes creating one or more controllers via input such as service endpoint from where the microservice will fetch data, controller uniform resource locator which will be used to access data via the microservice, specified input parameters, specified output parameters, business logic, etc. Step 314 includes reviewing the configurations, and finishing creation of the microservice. Further, step 316 includes building the microservice and deploying it directly to one or more cloud platforms.

Figure 4A:
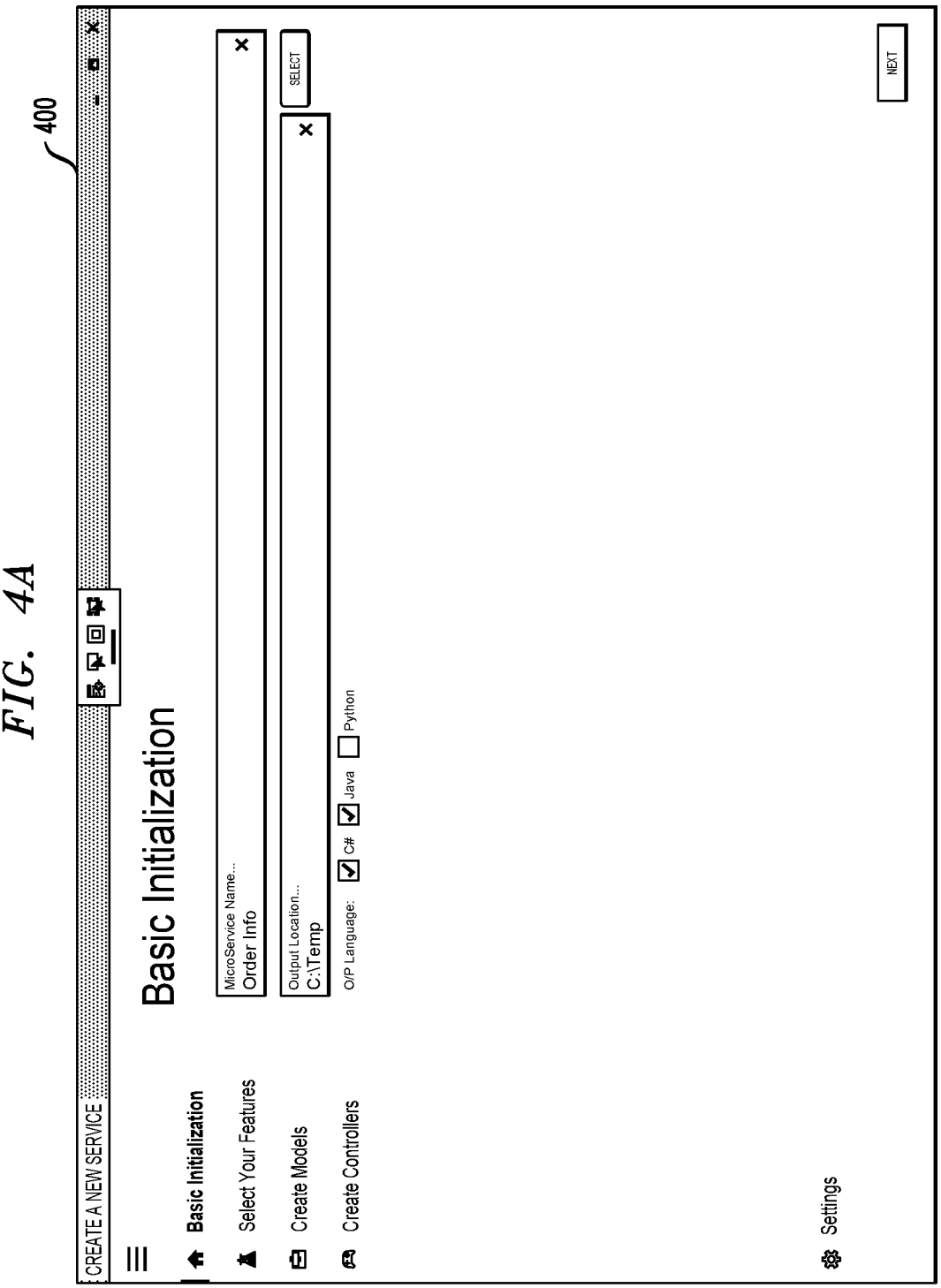
FIG. 4A through FIG. 4E shows a sequence of screen shots illustrating creation of a new microservice in an illustrative embodiment.
Figure 4B:
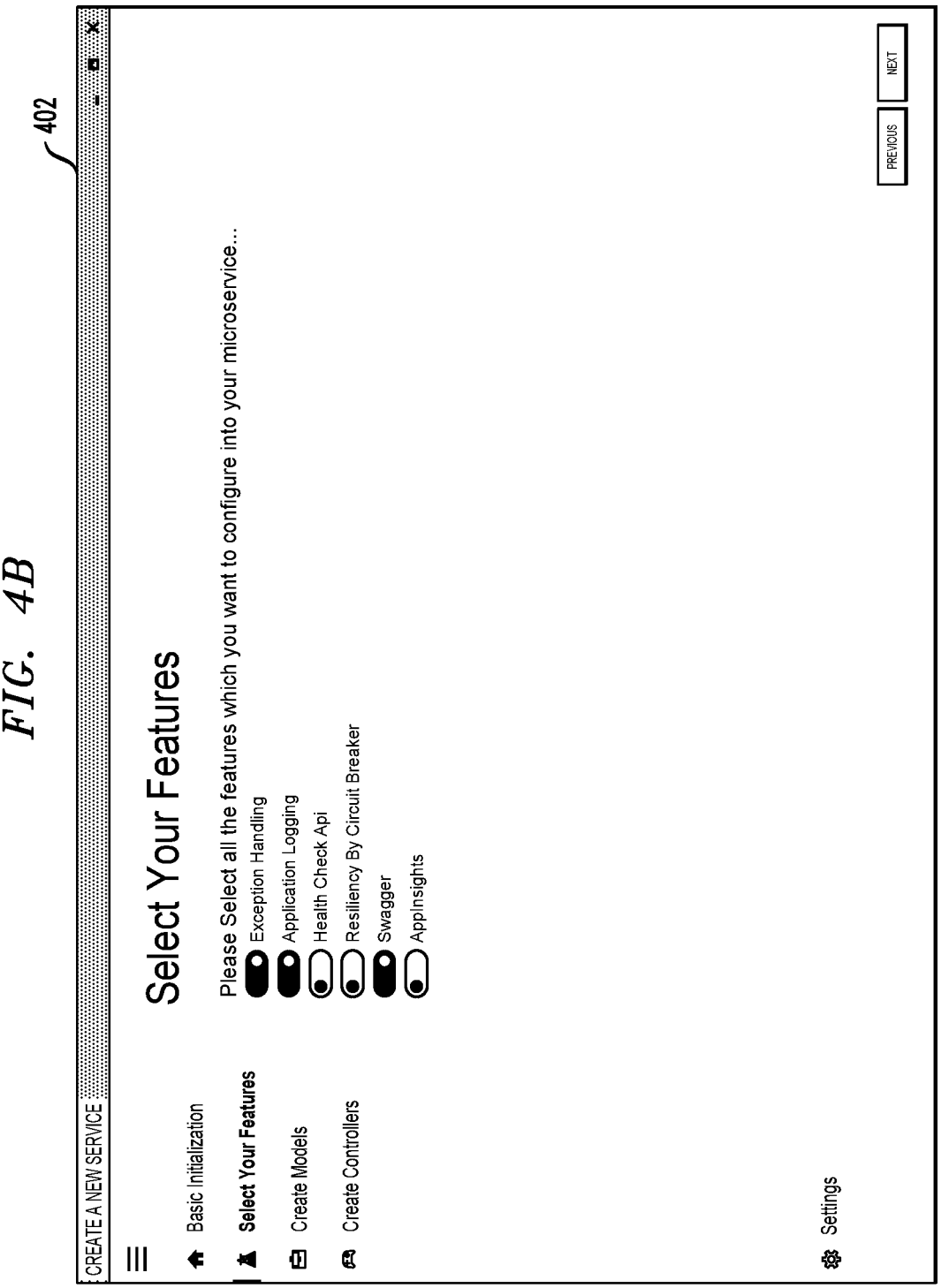
Figure 4C:
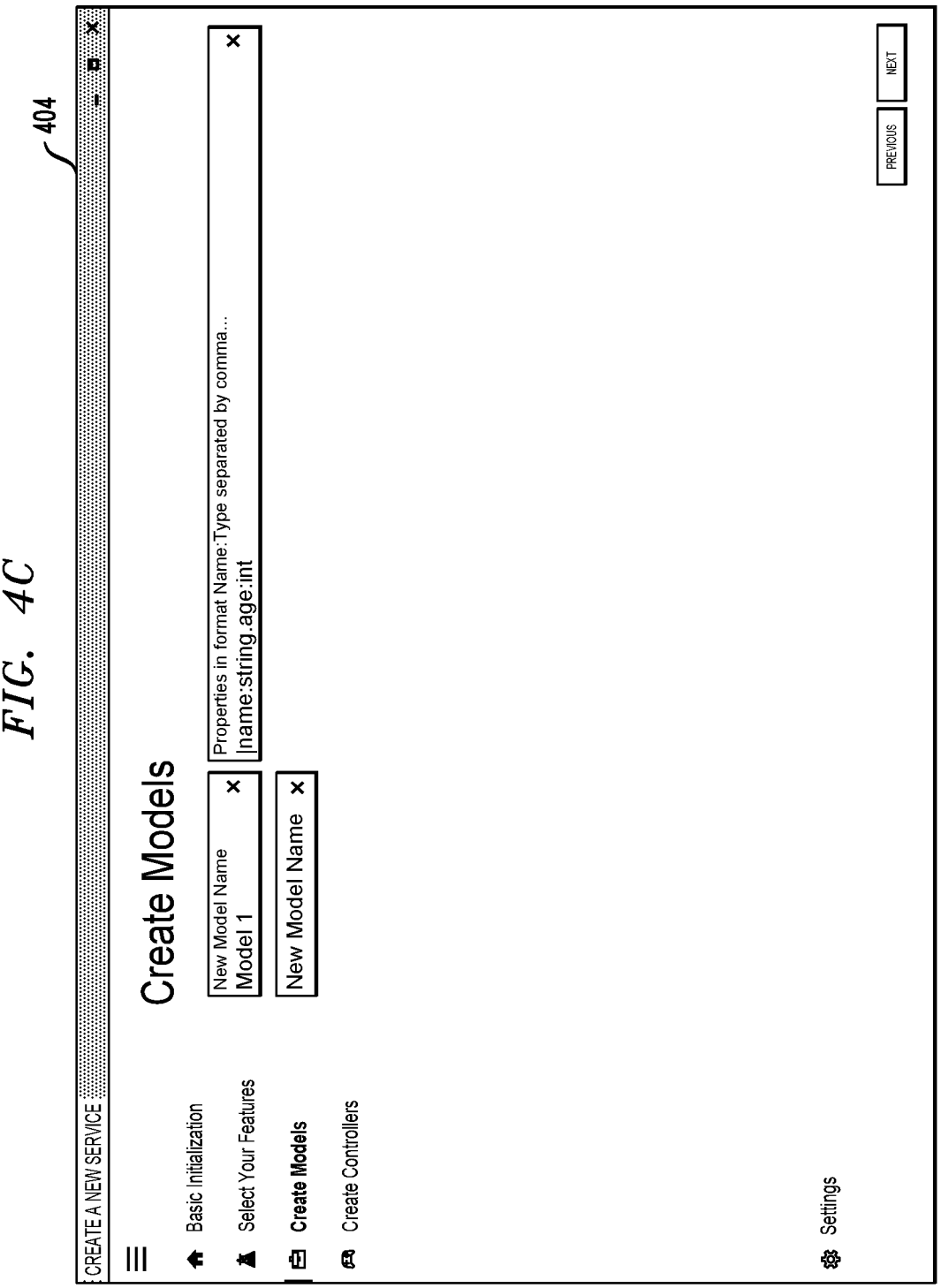
Figure 4D:
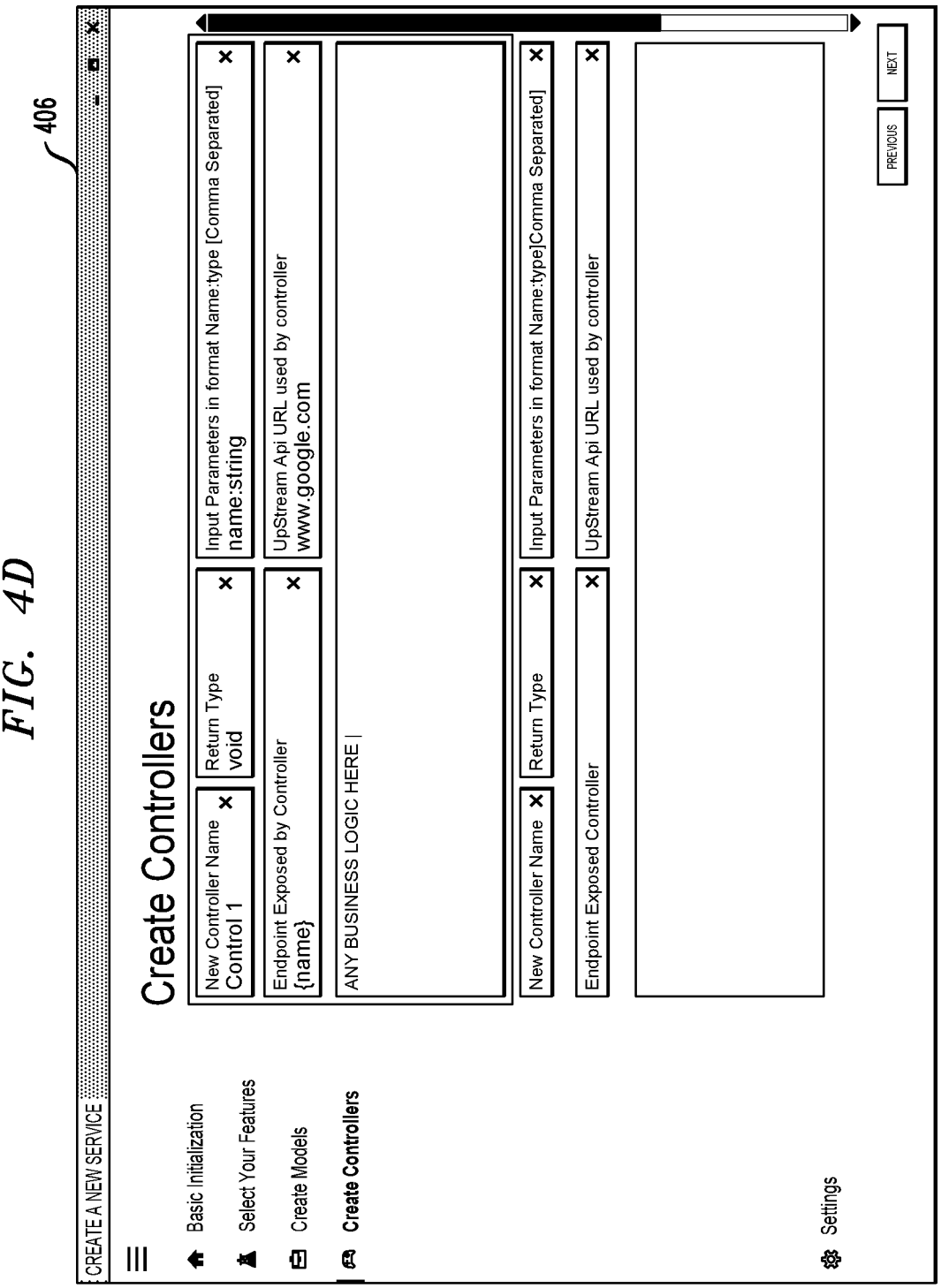
Figure 4E:
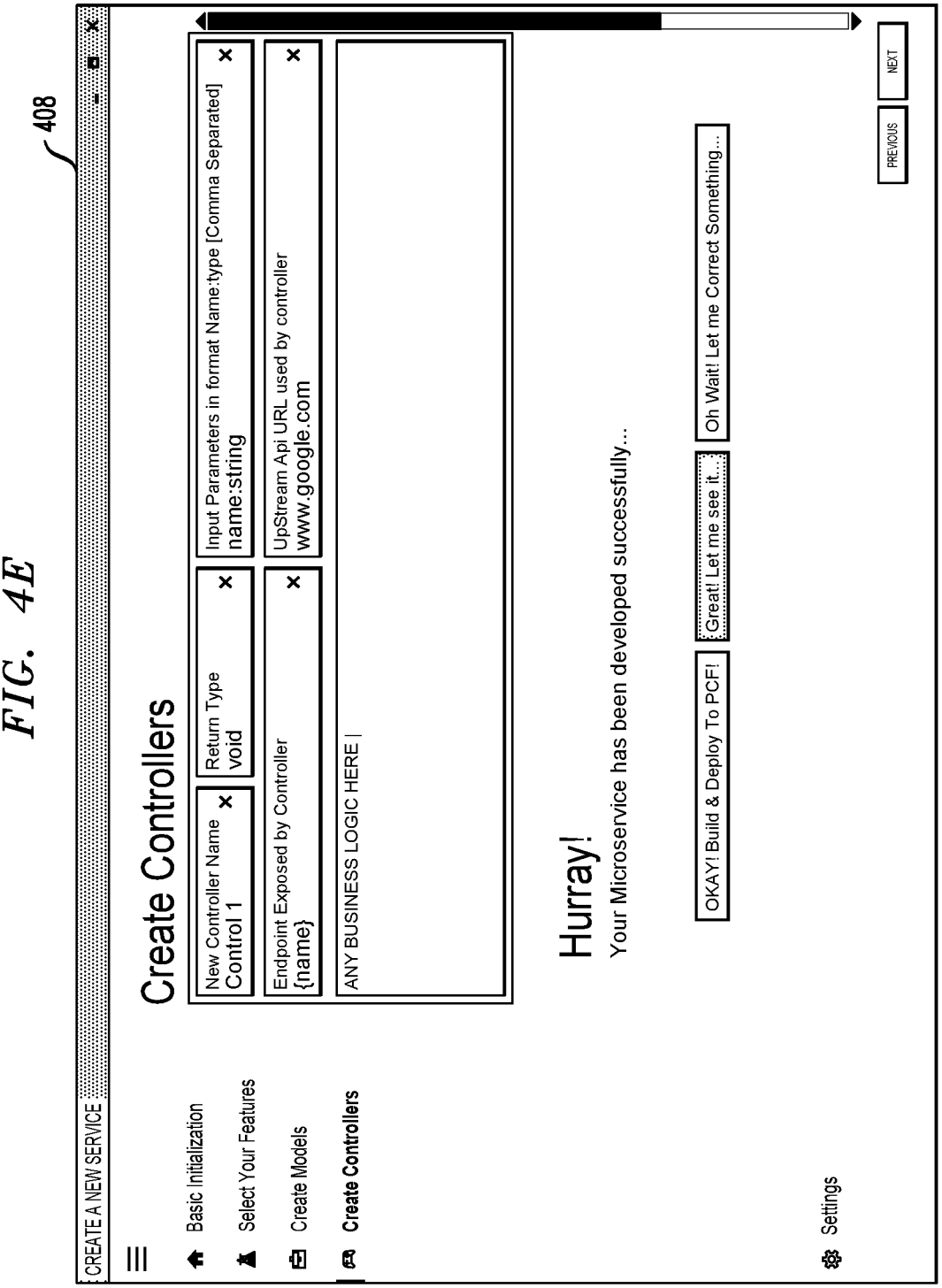

FIG. 4A through FIG. 4E shows a sequence of screen shots illustrating creation of a new microservice in an illustrative embodiment. Specifically, FIG. 4A depicts screen shot 400, which illustrates an initialization GUI prompting the user to input monolith path information and an output location for a target microservice. Additionally, FIG. 4B depicts screen shot 402, which illustrates a GUI prompt for the user to select one or more of an offered collection of microservice features. FIG. 4C depicts screen shot 404, which illustrates a GUI for creating one or more data models, including prompts for new model name and model properties. FIG. 4D depicts screen shot 406, which illustrates a GUI for creating one or more controllers, including prompts for new controller name, return type, input parameters, end-point exposed by the controller, upstream application programming interface uniform resource locator used by the controller, and business logic. Also, FIG. 4E depicts screen shot 408, which illustrates a microservice creation completion notification, as well as prompts for deployment, use, and user review.

Figure 5:
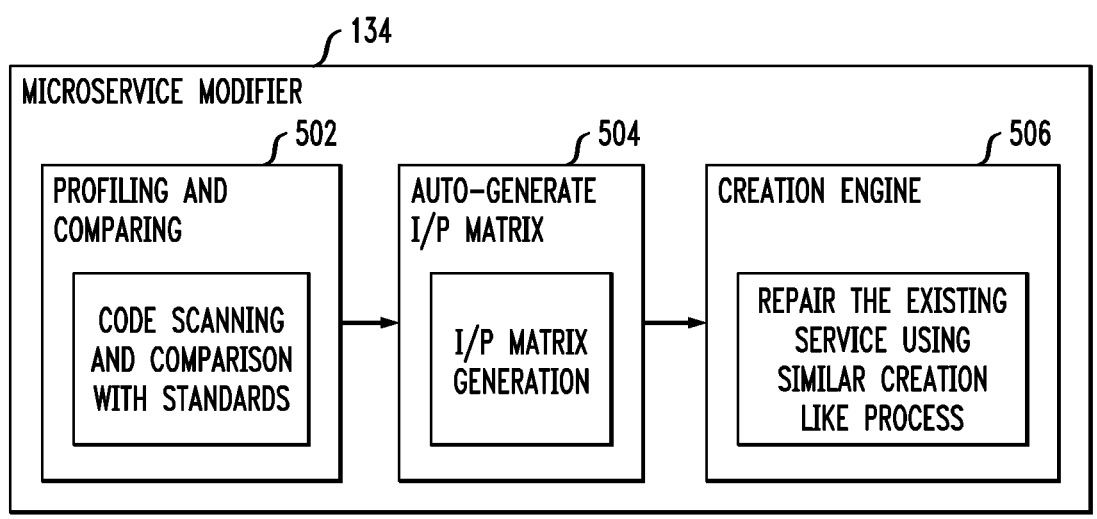
FIG. 5 is a system architecture diagram for a microservice repair workflow in an illustrative embodiment.

FIG. 5 is a system architecture diagram for a microservice repair and/or modification workflow in an illustrative embodiment. By way of illustration, FIG. 5 depicts a microservice modifier 134, which includes a profiling and comparing component 502, an input matrix auto-generation component 504, and a creation engine 506. The profiling and comparing component 502 scans code of the existing microservice and compares the scanned code with one or more standards. The results of this scan and comparison are used by component 504 to generate an input matrix, which is then used by the creation engine 506 to repair and/or modify the existing microservice (which can be carried out, for example, via a process similar to the process depicted in FIG. 2).

Figure 6A:
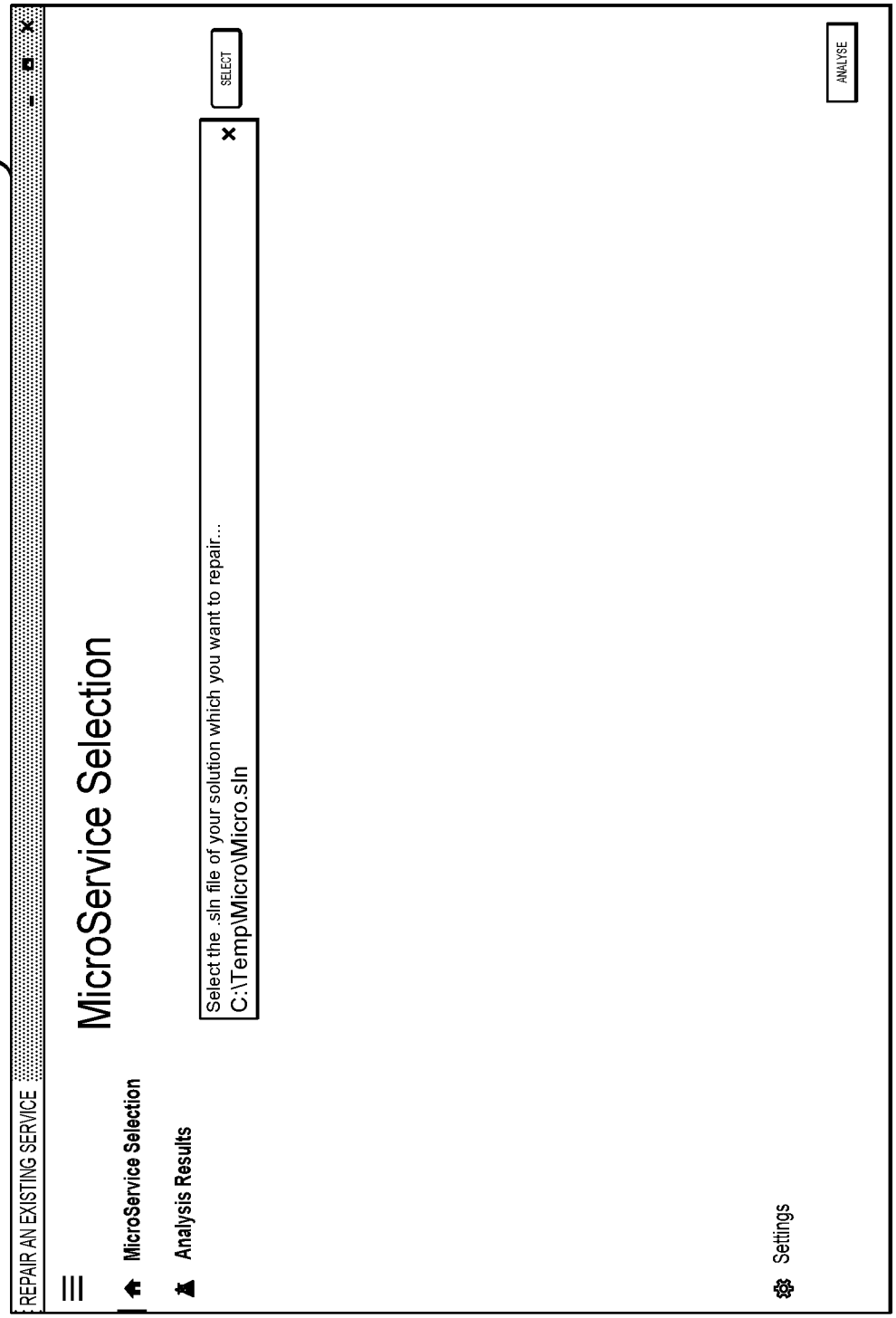
FIG. 6A through FIG. 6B shows a sequence of screen shots illustrating modification of an existing microservice in an illustrative embodiment.
Figure 6B:
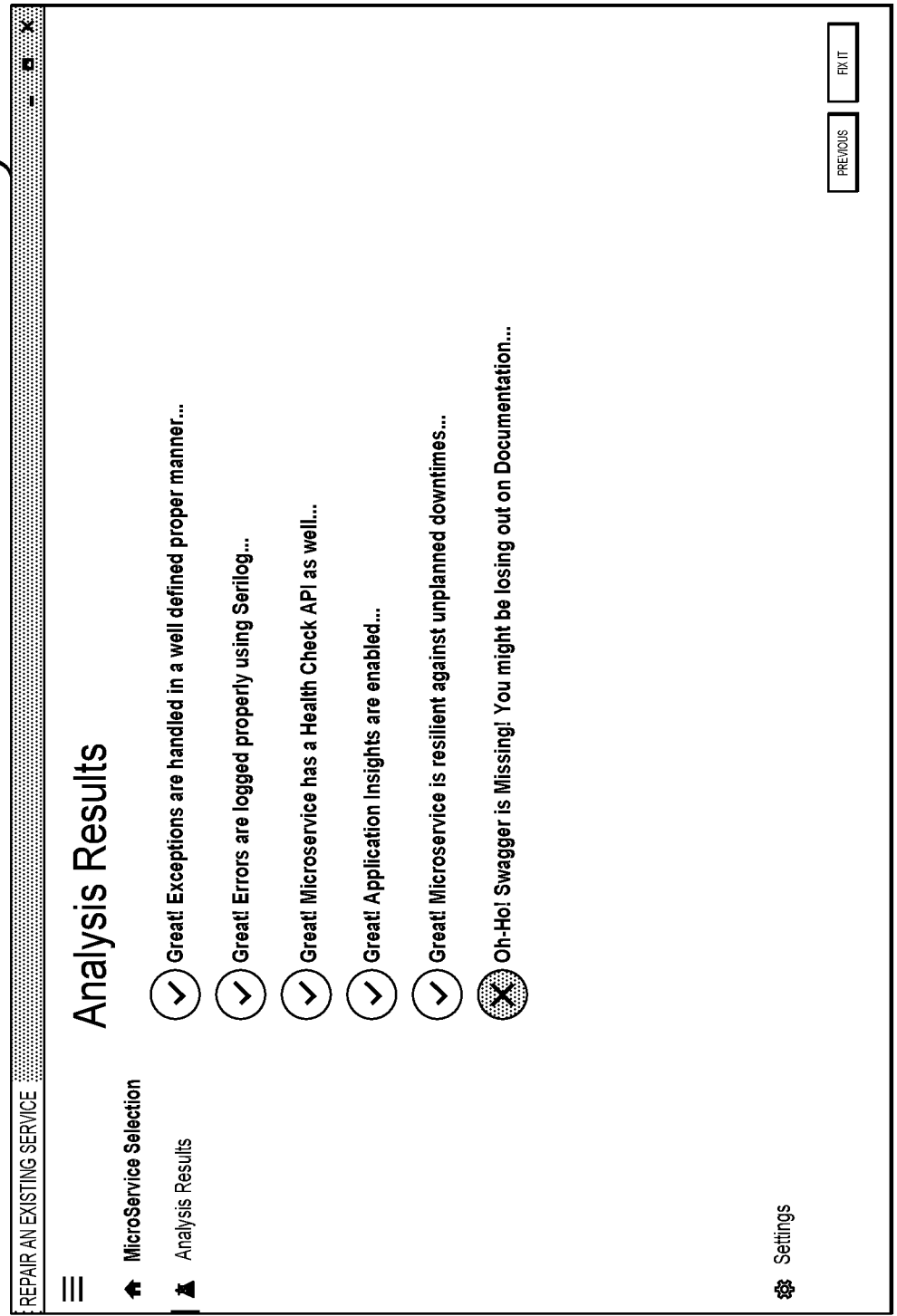

FIG. 6A through FIG. 6B shows a sequence of screen shots illustrating modification of an existing microservice in an illustrative embodiment. Specifically, FIG. 6A depicts screen shot 600, which illustrates a microservice selection GUI prompting the user to input the file of the microservice which the user wants to repair and/or modify. Additionally, FIG. 6B depicts screen shot 602, which illustrates results of the scanning and comparison analysis (similar to that described in connection with FIG. 5), identifying one or more aspects of the existing microservice that are present and/or up-to-date as well as recommending one or more aspects that are missing from the existing microservice and/or out-of-date in the existing microservice.

Figure 7:
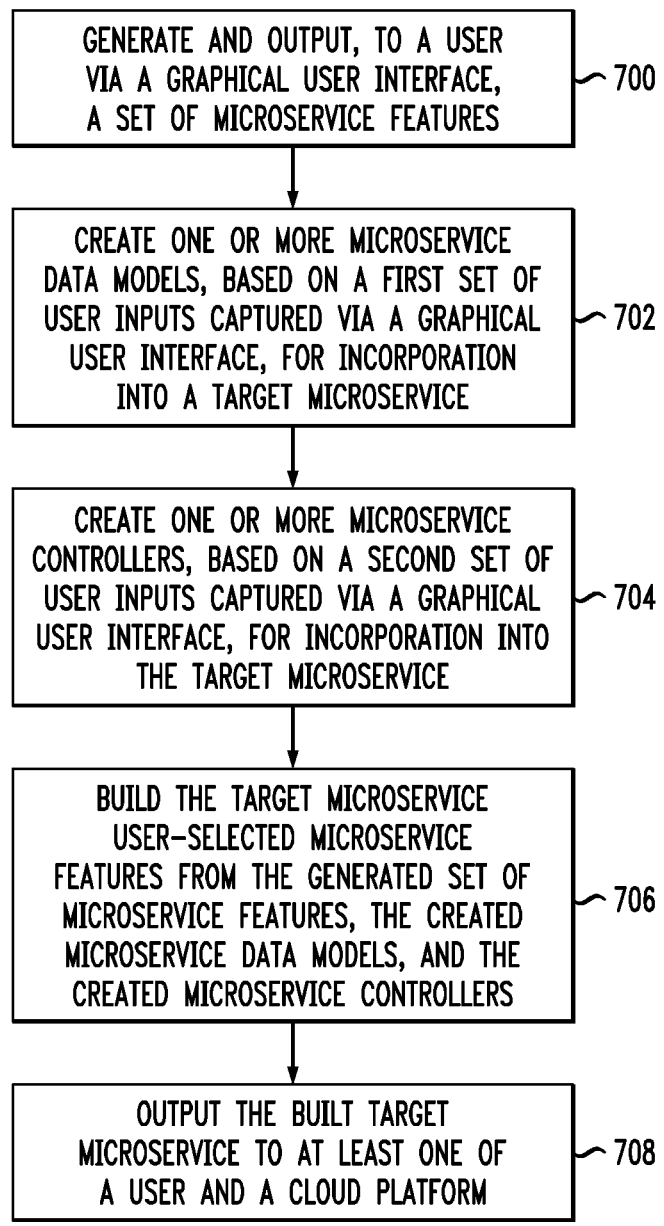
FIG. 7 is a flow diagram of a process for creating a new microservice in an illustrative embodiment.

FIG. 7 is a flow diagram of a process for creating a new microservice in an illustrative embodiment. It is to be understood that this particular process is only an example, and additional or alternative processes can be carried out in other embodiments. In this embodiment, the process includes steps 700 through 708. These steps are assumed to be performed by the processor 120 utilizing its modules 130, 132 and 136.

Step 700 includes generating and outputting, to a user via at least one graphical user interface, a set of microservice features. At least one embodiment of the invention includes gathering and/or compiling all of the user input, via a GUI, wherein the user input includes a set of microservice features, information related to one or more data models, information related to one or more microservice controllers, as well as additional information such as, for example, database connection details, MQ-related configuration, platform and language selection, etc.

Step 702 includes creating one or more microservice data models, based at least in part on a first set of one or more user inputs captured via at least one graphical user interface, for incorporation into a target microservice (along with all applicable microservice features). Step 704 includes (keeping in mind all applicable microservice features) creating one or more microservice controllers, based at least in part on a second set of one or more user inputs captured via at least one graphical user interface, for incorporation into the target microservice.

Step 706 includes building the target microservice based at least in part on one or more user-selected microservice features from the generated set of microservice features, the one or more created microservice data models, and the one or more created microservice controllers. In one or more embodiments of the invention, building the target microservice includes incorporating and/or packaging all of the user-selected microservice features, properties in data models, as well as business logic in controllers. Step 708 includes outputting the built target microservice a user and/or deploying the built target microservice to one or more cloud platforms autonomously.

Figure 8:
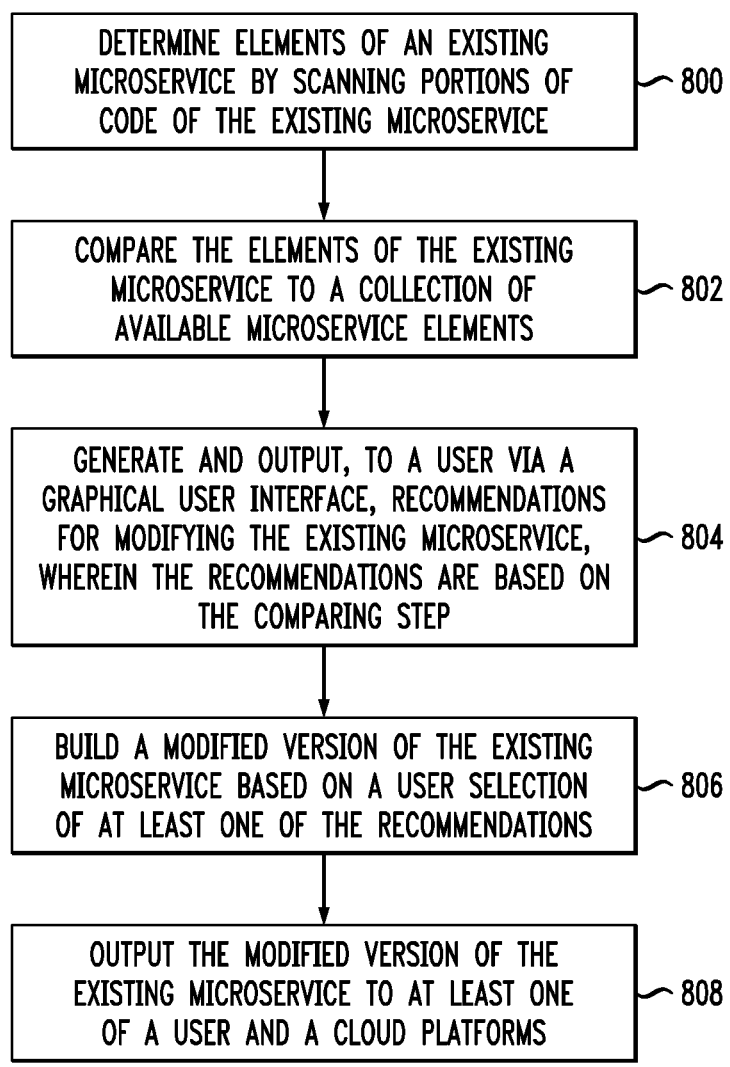
FIG. 8 is a flow diagram of a process for modifying an existing microservice in an illustrative embodiment.

FIG. 8 is a flow diagram of a process for modifying an existing microservice in an illustrative embodiment. It is to be understood that this particular process is only an example, and additional or alternative processes can be carried out in other embodiments. In this embodiment, the process includes steps 800 through 808. These steps are assumed to be performed by the processor 120 utilizing its modules 130, 132, 134 and 136.

Step 800 includes determining one or more elements of an existing microservice by scanning one or more portions of code of the existing microservice. Step 802 includes comparing the one or more elements of the existing microservice to a collection of available microservice elements. Step 804 includes generating and outputting, to a user via at least one graphical user interface, one or more recommendations for modifying the existing microservice, wherein the one or more recommendations are based at least in part on the comparing of the one or more elements of the existing microservice to the collection of available microservice elements. In one or more embodiments of the invention, such a feature can also be used and/or reused as a compliance checker for one or more microservices.

Step 806 includes building a modified version of the existing microservice based at least in part on a user selection of at least one of the one or more recommendations. Step 808 includes outputting the modified version of the existing microservice to at least one of a user and one or more cloud platforms.

Accordingly, at least one embodiment of the invention can include generating and outputting, to a user via at least one graphical user interface, one or more prompts for user input pertaining to a target microservice, automatically configuring, for the target microservice, one or more microservice components based at least in part on the user input received in response to the one or more prompts, building the target microservice based at least in part on the one or more automatically configured microservice components, and outputting the built target microservice to at least one of a user and one or more cloud platforms.

In such an embodiment, the user input can include name information for the target microservice and/or output location information for the target microservice. Additionally, in such an embodiment, the user input can include one or more microservice features selected for inclusion in the target microservice, wherein the set of microservice features can include, for example, providing resiliency via one or more circuit breaker patterns, providing security via one or more access tokens, one or more service health checks, one or more error handling techniques, logging framework, etc. Also, one or more embodiments of the invention can include adding one or more microservice features to the graphical user interface and/or removing one or more microservice features from the graphical user interface in a subsequent iteration of such an embodiment.

Further, in such an embodiment, the user input can include name information for one or more data models to be incorporated into the target microservice and/or property information for one or more data models to be incorporated into the target microservice. Additionally, the user input can include name information for one or more controllers to be incorporated into the target microservice, parameter information for one or more controllers to be incorporated into the target microservice, and/or business logic related to one or more controllers to be incorporated into the target microservice.

In such an embodiment, automatically configuring the one or more microservice components can include creating one or more microservice data models based at least in part on the user input received in response to the one or more prompts. Further, automatically configuring the one or more microservice components can include creating one or more microservice controllers based at least in part on the user input received in response to the one or more prompts. Additionally, building the target microservice can include integrating one or more user-selected microservice features, one or more created microservice data models, and one or more created microservice controllers.

Also, in one or more embodiments of the invention, the target microservice can include an existing microservice, and the user input can include identification of the existing microservice. Such an embodiment can include determining one or more elements of the existing microservice by scanning one or more portions of code of the existing microservice, and comparing the one or more elements of the existing microservice to a collection of available microservice elements. Further, in such an embodiment, the one or more prompts can include one or more recommendations for modifying the existing microservice, wherein the recommendations are based at least in part on the comparing of the one or more elements of the existing microservice to the collection of available microservice elements. Additionally, in such an embodiment, building the target microservice can include building a modified version of the existing microservice based at least in part on a user selection of at least one of the one or more recommendations, and outputting the microservice can include outputting the modified version of the existing microservice to a user and/or one or more cloud platforms.

Also, in such an embodiment of the invention, building the modified version of the existing microservice can include modifying a set of one or more microservice features in the existing microservice, modifying a set of one or more microservice data models in the existing microservice, and/or modifying a set of one or more microservice controllers in the existing microservice.

Accordingly, the particular processing operations and other network functionality described in conjunction with the flow diagrams of FIG. 7 and FIG. 8 are presented by way of illustrative example only, and should not be construed as limiting the scope of the invention in any way. Alternative embodiments can use other types of processing operations to detect session-based access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of session-based anomaly detection for different user identifiers.

The above-described illustrative embodiments provide significant advantages relative to conventional approaches. For example, some embodiments are configured to provide a tool which can build a new microservice for a user, as well as repair and/or modify an existing microservice for a user, using an interactive GUI. These and other embodiments can effectively save time and effort, as well as facilitate the maintenance of consistent code quality across multiple users and/or teams by providing an automated mechanism for developing microservices.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
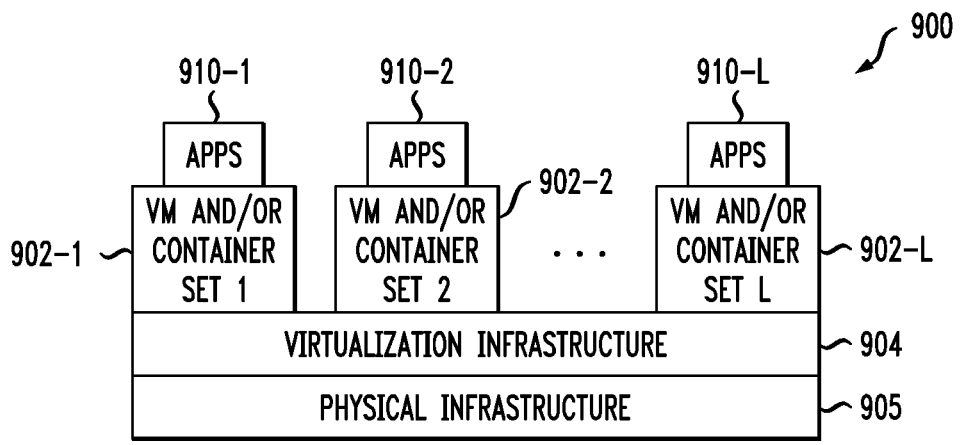
FIGS. 9 and 10 show examples of processing platforms that may be utilized to implement at least a portion of an information processing system in illustrative embodiments.
Figure 10:
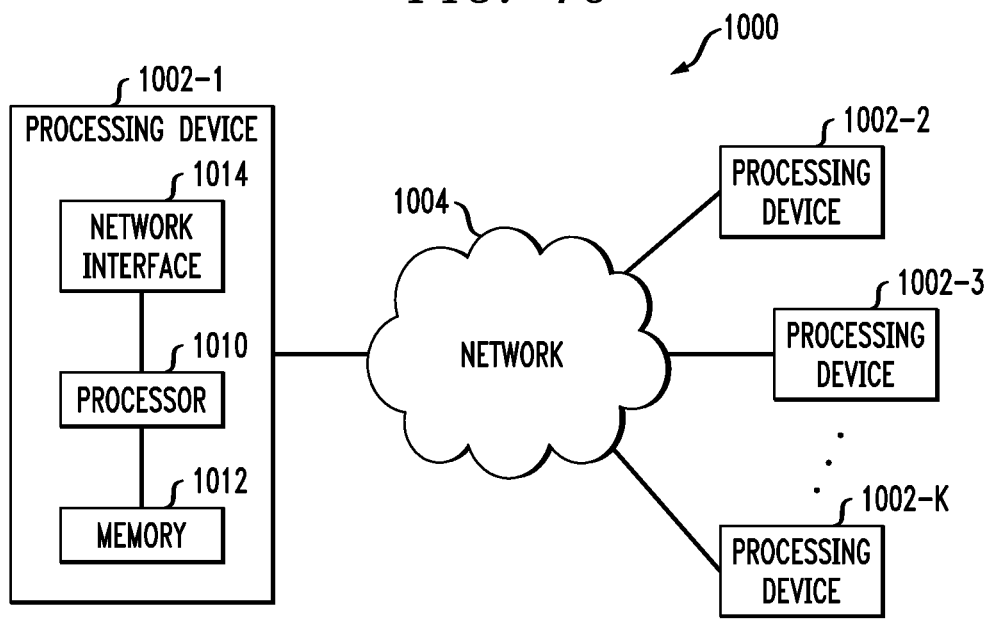

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide deduplication estimate generation functionality of the type described above for one or more processes running on a given one of the VMs. For example, each of the VMs can implement deduplication control logic and associated deduplication estimate tables for providing deduplication estimate generation functionality for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide deduplication estimate generation functionality of the type described above for one or more processes running on different ones of the containers. For example, a container host device supporting multiple containers of one or more container sets can implement one or more instances of deduplication control logic and associated deduplication estimate tables for use in generating deduplication estimates.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide microservice creation and modification capabilities. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
generating and outputting, to a user via at least one graphical user interface, one or more prompts for user input pertaining to a target microservice;
automatically configuring, for the target microservice, one or more microservice components based at least in part on the user input received in response to the one or more prompts, wherein the user input comprises a matrix containing at least one or more target microservice features, and wherein automatically configuring the one or more microservice component comprises:
generating one or more data models based at least in part on the user-provided matrix; and
generating one or more controllers that encompass the one or more target microservice features contained within the user-provided matrix, wherein generating the one or more controllers is based on inputs comprising name information for the one or more controllers to be incorporated into the target microservice, information pertaining to at least one service endpoint from where the target microservice will fetch data, information pertaining to at least one controller uniform resource locator to be used to access data via the target microservice, input parameter information and output parameter information for the one or more controllers to be incorporated into the target microservice, and business logic related to the one or more controllers to be incorporated into the target microservice;
building the target microservice based at least in part on the one or more automatically configured microservice components, wherein building the target microservice comprises:
generating code that integrates the one or more generated data models and the one or more generated controllers;
removing the one or more blank lines from the generated code;
adding one or more tabs spaces to the generated code; and
performing at least one auto-correction task on the generated code; and
outputting the built target microservice to at least one of a user and one or more cloud platforms;
wherein the method is performed by at least one processing device comprising a processor coupled to a memory.

2. The computer-implemented method of claim 1, wherein the user input comprises at least one of name information for the target microservice and output location information for the target microservice.

3. The computer-implemented method of claim 1, wherein the user input comprises one or more microservice features selected for inclusion in the target microservice.

4. The computer-implemented method of claim 3, further comprising adding one or more microservice features to the at least one graphical user interface in a subsequent iteration of generating and outputting the one or more prompts for user input pertaining to a target microservice.

5. The computer-implemented method of claim 3, further comprising removing one or more microservice features from the at least one graphical user interface in a subsequent iteration of generating and outputting the one or more prompts for user input pertaining to a target microservice.

6. The computer-implemented method of claim 1, wherein the user input comprises at least one of name information for one or more data models to be incorporated into the target microservice and property information for one or more data models to be incorporated into the target microservice.

7. The computer-implemented method of claim 1, wherein the target microservice comprises an existing microservice, and wherein the user input comprises identification of the existing microservice.

8. The computer-implemented method of claim 7, further comprising:
determining one or more elements of the existing microservice by scanning one or more portions of code of the existing microservice; and
comparing the one or more elements of the existing microservice to a collection of available microservice elements.

9. The computer-implemented method of claim 8, wherein the one or more prompts comprise one or more recommendations for modifying the existing microservice, wherein the one or more recommendations are based at least in part on the comparing of the one or more elements of the existing microservice to the collection of available microservice elements.

10. The computer-implemented method of claim 9, wherein building the target microservice comprises building a modified version of the existing microservice based at least in part on a user selection of at least one of the one or more recommendations; and
wherein outputting comprises outputting the modified version of the existing microservice to at least one of a user and one or more cloud platforms.

11. A non-transitory processor-readable storage medium having stored therein program code of one or more software programs, wherein the program when executed by at least one processing device causes said at least one processing device;
to generate and output, to a user via at least one graphical user interface, one or more prompts for user input pertaining to a target microservice;
to automatically configure, for the target microservice, one or more microservice components based at least in part on the user input received in response to the one or more prompts, wherein the user input comprises a matrix containing at least one or more target microservice features, and wherein automatically configuring the one or more microservice component comprises:
generating one or more data models based at least in part on the user-provided matrix; and
generating one or more controllers that encompass the one or more target microservice features contained within the user-provided matrix, wherein generating the one or more controllers is based on inputs comprising name information for the one or more controllers to be incorporated into the target microservice, information pertaining to at least one service endpoint from where the target microservice will fetch data, information pertaining to at least one controller uniform resource locator to be used to access data via the target microservice, input parameter information and output parameter information for the one or more controllers to be incorporated into the target microservice, and business logic related to the one or more controllers to be incorporated into the target microservice;
to build the target microservice based at least in part on the one or more automatically configured microservice components, wherein building the target microservice comprises:
generating code that integrates the one or more generated data models and the one or more generated controllers;
removing the one or more blank lines from the generated code;
adding one or more tabs spaces to the generated code; and
performing at least one auto-correction task on the generated code; and
to output the built target microservice to at least one of a user and one or more cloud platforms.

12. The non-transitory processor-readable storage medium of claim 11, wherein building the target microservice comprises building a modified version of an existing microservice based at least in part on a user selection of at least one of one or more recommendations, wherein the one or more recommendations are based at least in part on a comparison of one or more elements of the existing microservice to a collection of available microservice elements.

13. The non-transitory processor-readable storage medium of claim 11, wherein the user input comprises at least one of name information for one or more data models to be incorporated into the target microservice and property information for one or more data models to be incorporated into the target microservice.

14. The non-transitory processor-readable storage medium of claim 11, wherein the user input comprises at least one of name information for the target microservice and output location information for the target microservice.

15. The non-transitory processor-readable storage medium of claim 11, wherein the target microservice comprises an existing microservice, and wherein the user input comprises identification of the existing microservice.

16. An apparatus comprising:
at least one processing device comprising a processor coupled to a memory;
said at least one processing device being configured:
to generate and output, to a user via at least one graphical user interface, one or more prompts for user input pertaining to a target microservice;
to automatically configure, for the target microservice, one or more microservice components based at least in part on the user input received in response to the one or more prompts, wherein the user input comprises a matrix containing at least one or more target microservice features, and wherein automatically configuring the one or more microservice component comprises:
generating one or more data models based at least in part on the user-provided matrix; and
generating one or more controllers that encompass the one or more target microservice features contained within the user-provided matrix, wherein generating the one or more controllers is based on inputs comprising name information for the one or more controllers to be incorporated into the target microservice, information pertaining to at least one service endpoint from where the target microservice will fetch data, information pertaining to at least one controller uniform resource locator to be used to access data via the target microservice, input parameter information and output parameter information for the one or more controllers to be incorporated into the target microservice, and business logic related to the one or more controllers to be incorporated into the target microservice;
to build the target microservice based at least in part on the one or more automatically configured microservice components, wherein building the target microservice comprises:
generating code that integrates the one or more generated data models and the one or more generated controllers;
removing the one or more blank lines from the generated code;
adding one or more tabs spaces to the generated code; and
performing at least one auto-correction task on the generated code; and
to output the built target microservice to at least one of a user and one or more cloud platforms
wherein the method is performed by at least one processing device comprising a processor coupled to a memory.

17. The apparatus of claim 16, wherein building the target microservice comprises building a modified version of an existing microservice based at least in part on a user selection of at least one of one or more recommendations, wherein the one or more recommendations are based at least in part on a comparison of one or more elements of the existing microservice to a collection of available microservice elements.

18. The apparatus of claim 16, wherein the user input comprises at least one of name information for one or more data models to be incorporated into the target microservice and property information for one or more data models to be incorporated into the target microservice.

19. The apparatus of claim 16, wherein the user input comprises at least one of name information for the target microservice and output location information for the target microservice.

20. The apparatus of claim 16, wherein the target microservice comprises an existing microservice, and wherein the user input comprises identification of the existing microservice.

* * * * *

UNITED STATES PATENT AND TRADEMARK OFFICE
CERTIFICATE OF CORRECTION

PATENT NO. : 10,860,339 B2
APPLICATION NO. : 16/054003
DATED : December 8, 2020
INVENTOR(S) : Shubham Gupta Page 1 of 1

It is certified that error appears in the above-identified patent and that said Letters Patent is hereby corrected as shown below:

In the Claims

In Claim 1, Column 13, Line 42, please delete "the" after the word "removing" and before the words "one or more blank lines".

In Claim 11, Column 14, Line 39, please add "code" after the word "program" and before the words "when executed".

In Claim 11, Column 15, Line 10, please delete "the" after the word "removing" and before the words "one or more blank lines".

In Claim 16, Column 16, Line 24, please delete "the" after the word "removing" and before the words "one or more blank lines".

In Claim 16, Column 16, Lines 32-34, please delete "wherein the method is performed by at least one processing device comprising a processor coupled to a memory".

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*